US007088218B2

(12) United States Patent
Chuey

(10) Patent No.: US 7,088,218 B2
(45) Date of Patent: Aug. 8, 2006

(54) WIRELESS APPLIANCE ACTIVATION TRANSCEIVER

(75) Inventor: Mark D. Chuey, Northville, MI (US)

(73) Assignee: Lear Corporation, Southfield, MI (US)

( * ) Notice: Subject to any disclaimer, the term of this patent is extended or adjusted under 35 U.S.C. 154(b) by 133 days.

(21) Appl. No.: 10/630,243

(22) Filed: Jul. 30, 2003

(65) Prior Publication Data

US 2005/0024184 A1 Feb. 3, 2005

(51) Int. Cl.
*G05B 19/00* (2006.01)
*G06F 7/00* (2006.01)
*G08B 29/00* (2006.01)
*H04B 1/00* (2006.01)
*H04L 9/14* (2006.01)

(52) U.S. Cl. ................ 340/5.23; 340/5.25; 340/825.69

(58) Field of Classification Search ........... 340/825.69, 340/825.79, 5.2, 5.7; 341/50, 176; 348/734
See application file for complete search history.

(56) References Cited

U.S. PATENT DOCUMENTS

| | | | |
|---|---|---|---|
| 1,522,241 | A | 1/1925 | Hennessey |
| 3,098,212 | A | 7/1963 | Creamer, Jr. |
| 3,300,867 | A | 1/1967 | Sampson |
| 3,337,992 | A | 8/1967 | Tolson |
| 3,456,387 | A | 7/1969 | Tolson |
| 3,680,951 | A | 8/1972 | Jordan et al. |
| 4,074,200 | A | 2/1978 | Buchta |
| 4,167,833 | A | 9/1979 | Farina et al. |
| 4,241,870 | A | 12/1980 | Marcus |
| 4,247,850 | A | 1/1981 | Marcus |
| 4,425,717 | A | 1/1984 | Marcus |
| 4,447,808 | A | 5/1984 | Marcus |
| 4,453,161 | A | 6/1984 | Lemelson |
| 4,535,333 | A | 8/1985 | Twardowski |
| 4,581,827 | A | 4/1986 | Higashi |
| 4,595,228 | A | 6/1986 | Chu |
| 4,598,287 | A | 7/1986 | Osakabe et al. |
| 4,623,887 | A | 11/1986 | Welles, II |
| 4,631,708 | A | 12/1986 | Wood et al. |
| 4,635,033 | A | 1/1987 | Inukai et al. |

(Continued)

FOREIGN PATENT DOCUMENTS

GB 2 182 790 A 10/1986

(Continued)

OTHER PUBLICATIONS

Combined Search and Examination Report Under Sections 17 and 18(3) mailed Nov. 2, 2004 for European patent application GB0416753.2.

(Continued)

*Primary Examiner*—Michael Horadik
*Assistant Examiner*—Nam Nguyen
(74) *Attorney, Agent, or Firm*—Brooks Kushman P.C.

(57) ABSTRACT

A universal remote control transmits one of a plurality of sequences of activation signals when activated. The remote control includes a receiver and a transmitter. At least one wireless channel is associated with a user activation input. Memory holds data describing rolling code transmission schemes and fixed code transmission schemes. Control logic maintains a channel mode set initially to a rolling code mode. The channel mode changes to one of at least one fixed code mode if the channel is trained to a fixed code. In response to an assertion of the user activation input for a particular channel, the control logic generates and transmits an activation signal based on each of a plurality of transmission schemes associated with the mode programmed for the channel.

23 Claims, 8 Drawing Sheets

U.S. PATENT DOCUMENTS 4,638,433 A 1/1987 Schindler
4,676,601 A 6/1987 Itoh et al.
4,707,788 A 11/1987 Tashiro et al.
RE32,576 E 1/1988 Pastore
4,727,302 A 2/1988 Mizuta et al.
4,743,905 A 5/1988 Wiegand
4,747,159 A 5/1988 Kato
4,750,118 A 6/1988 Heitschel et al.
4,754,255 A 6/1988 Sanders et al.
4,771,283 A 9/1988 Imoto
4,793,690 A 12/1988 Gahan et al.
4,806,930 A 2/1989 Wojciak, Jr.
4,825,200 A 4/1989 Evans et al.
4,881,148 A 11/1989 Lambropoulos et al.
4,882,565 A 11/1989 Gallmeyer
4,886,960 A 12/1989 Molyneux et al.
4,890,108 A 12/1989 Drori et al.
4,896,030 A 1/1990 Miyaji
4,905,279 A 2/1990 Nishio
4,917,477 A 4/1990 Bechtel et al.
4,953,305 A 9/1990 Van Lente et al.
4,978,944 A 12/1990 Andros et al.
4,988,992 A 1/1991 Heitschel et al.
5,016,996 A 5/1991 Ueno
5,064,274 A 11/1991 Alten
5,103,221 A 4/1992 Memmola
5,109,222 A 4/1992 Welty
5,113,821 A 5/1992 Fukui et al.
5,122,647 A 6/1992 Lynam et al.
5,123,008 A 6/1992 Beesley
5,126,686 A 6/1992 Tam
5,146,215 A 9/1992 Drori
5,154,617 A 10/1992 Suman et al.
5,181,423 A 1/1993 Philipps et al.
5,191,610 A 3/1993 Hill et al.
5,201,067 A 4/1993 Grube et al.
5,225,847 A 7/1993 Roberts et al.
5,243,322 A 9/1993 Thompson et al.
5,252,960 A 10/1993 Duhame
5,252,977 A 10/1993 Lueker et al.
5,266,945 A 11/1993 Peek et al.
5,278,547 A 1/1994 Suman et al.
5,369,706 A 11/1994 Latka
5,379,453 A 1/1995 Tigwell
5,402,105 A 3/1995 Doyle et al.
5,408,698 A 4/1995 Serizawa et al.
5,420,925 A 5/1995 Michaels
5,442,340 A 8/1995 Dykema
5,455,716 A 10/1995 Suman et al.
5,463,374 A 10/1995 Mendez et al.
5,471,668 A 11/1995 Soenen et al.
5,473,317 A 12/1995 Inomata et al.
5,475,366 A 12/1995 Van Lente et al.
5,479,155 A 12/1995 Zeinstra et al.
5,517,187 A 5/1996 Bruwer et al.
5,554,977 A 9/1996 Jablonski, Jr.
RE35,364 E 10/1996 Heitschel et al.
5,564,101 A 10/1996 Eisfeld et al.
5,583,485 A 12/1996 Van Lente et al.
5,594,429 A 1/1997 Nakahara
5,596,316 A 1/1997 Honeck
5,598,475 A 1/1997 Soenen et al.
5,613,732 A 3/1997 Demick
5,614,885 A 3/1997 Van Lente et al.
5,614,891 A 3/1997 Zeinstra et al.
5,619,190 A 4/1997 Duckworth et al.
5,627,529 A 5/1997 Duckworth et al.
5,645,308 A 7/1997 Fink
5,646,701 A 7/1997 Duckworth et al.
5,661,455 A 8/1997 Van Lente et al.
5,661,651 A 8/1997 Geschke et al.
5,661,804 A 8/1997 Dykema et al.
5,680,131 A 10/1997 Utz
5,680,134 A 10/1997 Tsui
5,686,903 A 11/1997 Duckworth et al.
5,686,904 A 11/1997 Bruwer
5,691,848 A 11/1997 Van Lente et al.
5,699,044 A 12/1997 Van Lente et al.
5,699,054 A 12/1997 Duckworth
5,699,055 A 12/1997 Dykema et al.
5,708,415 A 1/1998 Van Lente et al.
5,715,020 A 2/1998 Kuroiwa et al.
5,731,756 A 3/1998 Roddy
5,751,224 A 5/1998 Fitzgibbon
5,793,300 A 8/1998 Suman et al.
5,812,097 A 9/1998 Maldonado
5,831,548 A 11/1998 Fitzgibbon
5,838,255 A 11/1998 Di Croce
5,841,253 A 11/1998 Fitzgibbon et al.
5,841,390 A 11/1998 Tsui
5,841,813 A 11/1998 Van Nee
5,845,593 A 12/1998 Birkestrand
5,854,593 A 12/1998 Dykema et al.
5,872,513 A 2/1999 Fitzgibbon et al.
5,903,226 A 5/1999 Suman et al.
5,926,087 A 7/1999 Busch et al.
5,926,106 A 7/1999 Beran et al.
5,940,000 A 8/1999 Dykema
5,940,120 A 8/1999 Frankhouse et al.
5,949,349 A 9/1999 Farris et al.
6,002,332 A 12/1999 King
6,005,508 A 12/1999 Tsui
6,008,735 A * 12/1999 Chiloyan et al. ...... 340/825.22
6,021,319 A 2/2000 Tigwell
6,025,785 A 2/2000 Farris et al.
6,043,753 A * 3/2000 Okayasu et al. ........... 340/5.26
6,049,289 A 4/2000 Waggamon et al.
6,055,508 A 4/2000 Naor et al.
RE36,703 E 5/2000 Heitschel et al.
6,072,436 A 6/2000 Marougi
6,078,271 A 6/2000 Roddy et al.
6,081,203 A 6/2000 Fitzgibbon
6,091,343 A 7/2000 Dykema et al.
6,127,740 A 10/2000 Roddy et al.
6,130,625 A 10/2000 Harvey
6,131,019 A 10/2000 King
6,137,421 A 10/2000 Dykema
6,154,544 A 11/2000 Farris et al.
6,166,650 A 12/2000 Bruwer
6,175,312 B1 1/2001 Bruwer et al.
6,181,255 B1 1/2001 Crimmins et al.
6,191,701 B1 2/2001 Bruwer
6,243,000 B1 6/2001 Tsui
6,249,673 B1 6/2001 Tsui
6,271,765 B1 8/2001 King et al.
6,308,083 B1 10/2001 King
6,320,514 B1 11/2001 Flick
6,333,698 B1 12/2001 Roddy
6,344,817 B1 2/2002 Verzulli
6,359,558 B1 3/2002 Tsui
6,362,771 B1 3/2002 Schofield et al.
6,414,587 B1 7/2002 Fitzgibbon
6,441,719 B1 8/2002 Tsui
6,486,795 B1 11/2002 Sobel et al.
RE37,986 E 2/2003 Heitschel et al.
6,525,645 B1 2/2003 King et al.
6,556,681 B1 4/2003 King
6,556,813 B1 4/2003 Tsui
6,559,775 B1 5/2003 King
6,597,291 B1 7/2003 Tsui
6,634,408 B1 10/2003 Mays
6,690,796 B1 2/2004 Farris et al.
6,703,941 B1 3/2004 Blaker
6,810,123 B1 10/2004 Farris et al.

| | | | |
|---|---|---|---|
| 6,822,603 | B1 | 11/2004 | Crimmins et al. |
| 2002/0034303 | A1 | 3/2002 | Farris et al. |
| 2002/0067826 | A1 | 6/2002 | King |
| 2002/0075133 | A1 | 6/2002 | Flick |
| 2002/0126037 | A1 | 9/2002 | Fitzgibbon |
| 2002/0137479 | A1 | 9/2002 | Tsui |
| 2002/0140569 | A1 | 10/2002 | van Ee et al. |
| 2002/0163440 | A1 | 11/2002 | Tsui |
| 2002/0190872 | A1 | 12/2002 | Suman et al. |
| 2002/0191794 | A1 | 12/2002 | Farris et al. |
| 2002/0197955 | A1 | 12/2002 | Witkowski et al. |
| 2003/0016119 | A1 | 1/2003 | Teich |
| 2003/0016139 | A1 | 1/2003 | Teich |
| 2003/0033540 | A1 | 2/2003 | Fitzgibbon |
| 2003/0067394 | A1 | 4/2003 | Tsui |
| 2003/0076235 | A1 | 4/2003 | Tsui |
| 2003/0118187 | A1 | 6/2003 | Fitzgibbon |
| 2003/0189530 | A1 | 10/2003 | Tsui |
| 2003/0197594 | A1 | 10/2003 | Olson et al. |
| 2003/0197595 | A1 | 10/2003 | Olson et al. |
| 2003/0216139 | A1 | 11/2003 | Olson et al. |
| 2003/0228879 | A1 | 12/2003 | Witkowski et al. |
| 2004/0048622 | A1 | 3/2004 | Witkowski et al. |
| 2004/0066936 | A1 | 4/2004 | Farris et al. |
| 2004/0110472 | A1 | 6/2004 | Witkowski et al. |
| 2004/0243813 | A1 | 12/2004 | Farris et al. |
| 2005/0024184 | A1 | 2/2005 | Chuey |
| 2005/0024185 | A1 | 2/2005 | Chuey |
| 2005/0024229 | A1 | 2/2005 | Chuey |
| 2005/0024230 | A1 | 2/2005 | Chuey |
| 2005/0024254 | A1 | 2/2005 | Chuey |
| 2005/0024255 | A1 | 2/2005 | Chuey |
| 2005/0026601 | A1 | 2/2005 | Chuey |
| 2005/0026602 | A1 | 2/2005 | Chuey |
| 2005/0026605 | A1 | 2/2005 | Guthrie et al. |

FOREIGN PATENT DOCUMENTS

| | | | |
|---|---|---|---|
| GB | 2 302 751 | A | 6/1996 |
| GB | 2 336 433 | | 4/1999 |
| GB | 2335773 | A | 9/1999 |
| GB | 2 366 433 | A | 5/2000 |
| WO | WO 94/02920 | | 7/1993 |
| WO | WO 00/29699 | | 5/2000 |

OTHER PUBLICATIONS

Combined Search and Examination Report Under Sections 18 and 18(3) mailed Nov. 2, 2004 for European patent application GB 0416789.6.

Combined Search and Examination Report Under Sections 17 and 18(3) for European Application No. GB 0416742.5 dated Oct. 26, 2004.

German Search/Examination Document, German Patent Application No. 103 14, 228.2, Dec. 14, 2004.

Combined Search and Examination Report Under Sections 17 and 18(3) mailed Nov. 30, 2004 for the corresponding European patent application GB 0415908.3.

Search and Examination Report Under Sections 17 and 18(3), Sep. 25, 2003.

Garage Door/Gate Remote Control User's Instructions (Model 39), Skylink Technologies Inc., 2002.

HomeLink Wireless Control System Lighting Kit Installation, http://www.homelink.com/print/lighting_print.html.

HomeLink Wireless Control System Frequently Asked Questions, http://www.homelink.com/print/faq_print.html.

HomeLink Universal 2 Channel Receiver Model PR433-2, Installation Instructions, 114A2437, 2000.

Getting Started with HomeLink, Programming Garage Door Openers and Gates.

HomeLink Universal Transceiver Lighting Package Programming.

Microchip HCS360 Keeloq Code Hopping Encoder, Microchip Technology Inc., DS40152E, 2002.

Microchip TB003, An Introduction to Keeloq Code Hopping, Microchip Technology Inc., DS91002A, 1996.

Chamberlain LiftMaster Professional Universal Receiver Model 635LM Owner's Manual, 114A2128C, The Chamberlain Group, Inc., 2002.

Flash2Pass eliminates past garage door opener hassles using a secure and easy-to-install system, Press Release, F2P Electronics, Inc., Jan. 2002.

Flash2Pass Easy Set Up Instructions, v031003, F2P Technologies.

The X-10 Powerhouse Power Line Interface Model #PL513 and Two-Way Power Line Interface Model #TW523, Technical Note, Dave Rye, Rev. 2.4, PL/TWTN/1291.

Neural Networks for ECCM, Simon Haykin, McMaster University Communications Research Laboratory Technical Report 282, Neurocomputing for Signal Processing, Feb. 1994, http://www.crl.mcmaster.ca/cgi-bin/makerabs.p1?282.

DRFM Theory of Operation, KOR Electronics, Inc., http://www.korelectronics.com/product_sheets/theory-of-operations/drfm-theoryofop.htm.

Fabrication Process Combines Low Cost and High Reliability, Murat Eron, Richard J. Perko and R. James Gibson, Microwaves & RF, Oct. 1993.

Pager and Garage Door Opener Combination, Gail Marino, Motorola Technical Developments, vol. 10, Mar. 1990.

* cited by examiner

WIRELESS APPLIANCE ACTIVATION TRANSCEIVER

BACKGROUND OF THE INVENTION

1. Field of the Invention

The present invention relates to wireless remote control of appliances such as, for example, garage door openers.

2. Background Art

Home appliances, such as garage door openers, security gates, home alarms, lighting, and the like, may conveniently be operated from a remote control. Typically, the remote control is purchased together with the appliance. The remote control transmits a radio frequency activation signal which is recognized by a receiver associated with the appliance. Aftermarket remote controls are gaining in popularity as such devices can offer functionality different from the original equipment remote control. Such functionality includes decreased size, multiple appliance interoperability, increased performance, and the like. Aftermarket controllers are also purchased to replace lost or damaged controllers or to simply provide another remote control for accessing the appliance.

An example application for aftermarket remote controls are remote garage door openers integrated into an automotive vehicle. These integrated remote controls provide customer convenience, appliance interoperability, increased safety, and enhanced vehicle value. Present in-vehicle integrated remote controls provide a "universal" or programmable garage door opener which learns characteristics of an existing transmitter then, when prompted by a user, generates a single activation signal having the same characteristics. One problem with such devices is the difficulty experienced by users programming such devices. This is particularly true for rolling code receivers where the user must program both the in-vehicle remote control and the appliance receiver.

What is needed is a universal remote controller that is easier to program. This remote controller should be easily integrated into an automotive vehicle using simple electronic circuits.

SUMMARY OF THE INVENTION

The present invention provides a universal remote control that transmits one of a plurality of sequences of activation signals based on receiver characteristics.

A system for wirelessly activating an appliance responding to one of a plurality of transmission schemes is provided. The system includes a receiver and a transmitter. The system includes at least one wireless channel associated with a user activation input. Memory holds data describing rolling code transmission schemes associated with a rolling code mode and fixed code transmission schemes, at least one fixed code transmission scheme associated with each of at least one fixed code mode. Control logic maintains a channel mode set initially to rolling code mode. The channel mode changes to one of the fixed code modes if the channel is trained to a fixed code. In response to an assertion of the user activation input for a particular channel, the control logic generates and transmits an activation signal based on each transmission scheme associated with the mode maintained for the channel.

In an embodiment of the present invention, the control logic supports a single fixed code mode.

In another embodiment of the present invention, the control logic supports a plurality of fixed code modes. The control logic may determine between fixed code modes based on the size of a fixed code used to train the channel, the carrier frequency of a received signal used to train the channel, or through guess-and-test user interaction. Preferably, the channel is trained by extracting the fixed code from an activation signal sent from a fixed code transmitter to the receiver.

In still another embodiment of the present invention, the channel mode may be reset to rolling code mode by the user.

In yet another embodiment of the present invention, the system includes a data port for downloading into the memory data describing at least one scheme.

In a still further embodiment of the present invention, the control logic generates and transmits activation signals based on popularity of schemes, reducing the average activation latency time.

In yet a further embodiment of the present invention, the memory holds data representing a carrier frequency for each transmission scheme.

In a still further embodiment of the present invention, the memory holds a different counter value for each rolling code transmission scheme.

A method of controlling an appliance activated by a radio frequency activation signal is also provided. A mode is established as rolling mode. If a fixed code in a radio frequency activation signal received from an existing transmitter is detected, the fixed code is stored and the mode is changed to fixed mode. An activation request is received from a user. If the mode is rolling mode, a sequence of activation signals is generated and transmitted. Each activation signal is based on one of a plurality of rolling code transmission schemes. If the mode is fixed mode, at least one activation signal based on one a plurality of fixed code transmission schemes is generated and transmitted.

The above features, and other features and advantages of the present invention are readily apparent from the following detailed descriptions thereof when taken in connection with the accompanying drawings.

DETAILED DESCRIPTION OF THE PREFERRED EMBODIMENTS

Figure 1:
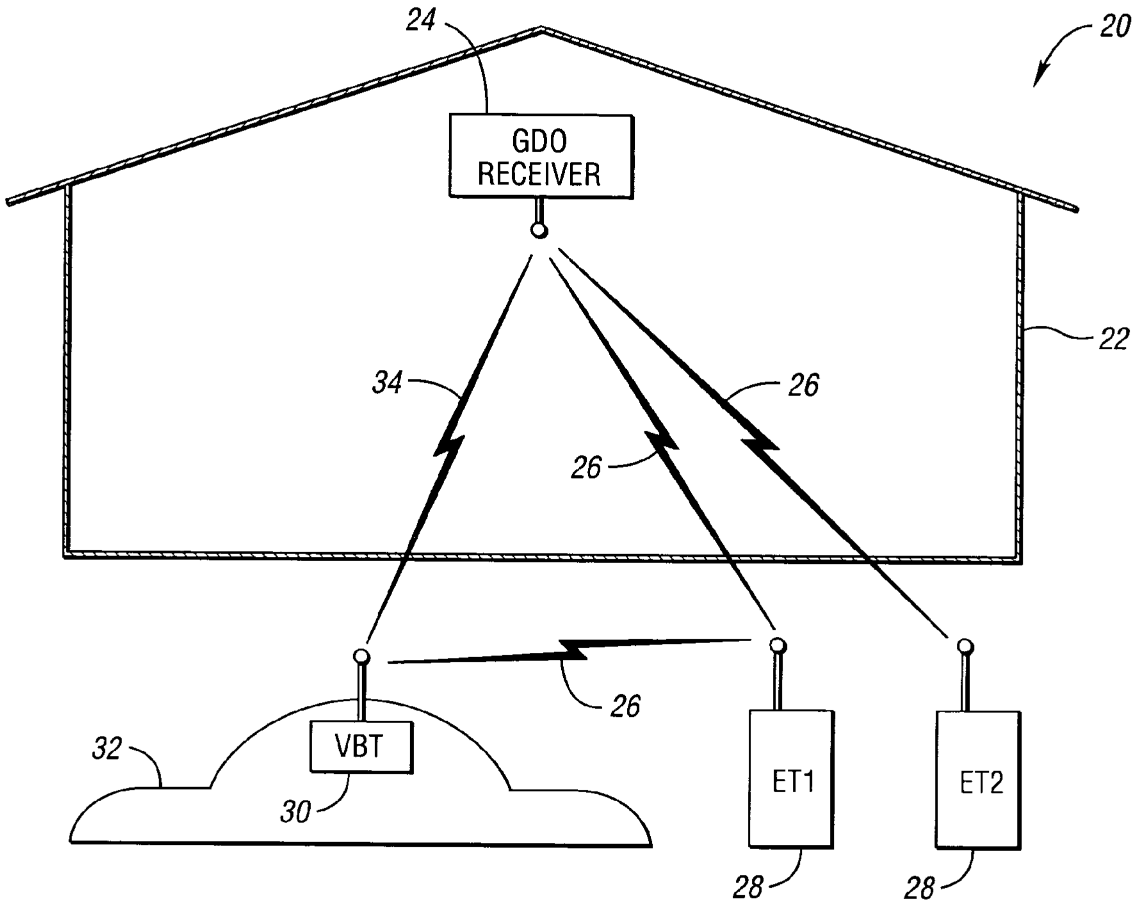
FIG. 1 is a block diagram illustrating an appliance control system according to an embodiment of the present invention.

Referring to FIG. 1, a block diagram illustrating an appliance control system according to an embodiment of the present invention is shown. An appliance control system, shown generally by 20, allows one or more appliances to be remotely controlled using radio transmitters. In the example shown, radio frequency remote controls are used to operate a garage door opener. However, the present invention may be applied to controlling a wide variety of appliances such as other mechanical barriers, lighting, alarm systems, temperature control systems, and the like.

Appliance control system 20 includes garage 22 having a garage door, not shown. Garage door opener (GDO) receiver 24 receives radio frequency control signals 26 for controlling a garage door opener. Activation signals have a transmission scheme which may be represented as a set of receiver characteristics. One or more existing transmitters (ET) 28 generate radio frequency activation signals 26 exhibiting the receiver characteristics in response to a user depressing an activation button.

A user of appliance control system 20 may wish to add a new transmitter to system 20. For example, vehicle-based transmitter 30 may be installed in vehicle 32, which may be parked in garage 22. Vehicle-based transceiver 30 generates a sequence of activation signals 34. Each activation signal in sequence 34 is generated based on a different transmission scheme. In the embodiment shown, transceiver 30 is mounted in vehicle 32. However, as will be recognized by one of ordinary skill in the art, the present invention applies to universal remote controls that may also be hand held, wall mounted, included in a key fob, and the like.

Figure 2:
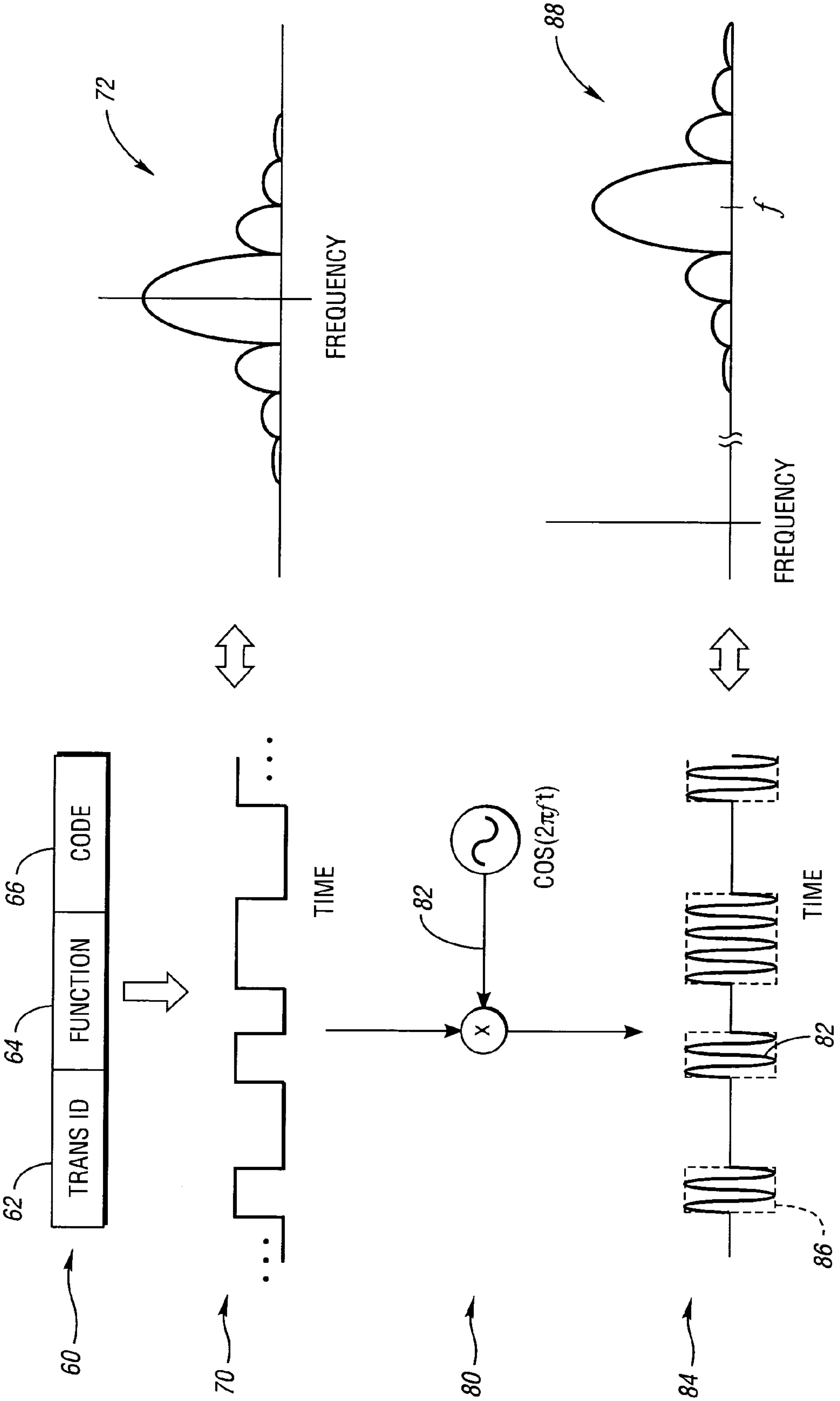
FIG. 2 is a schematic diagram illustrating activation signal characteristics according to an embodiment of the present invention.

Referring now to FIG. 2, a schematic diagram illustrating activation signal characteristics according to an embodiment of the present invention is shown. Information transmitted in an activation signal is typically represented as a binary data word, shown generally by 60. Data word 60 may include one or more fields, such as transmitter identifier 62, function indicator 64, code word 66, and the like. Transmitter identifier (TRANS ID) 62 uniquely identifies a remote control transmitter. Function indicator 64 indicates which of a plurality of functional buttons on the remote control transmitter were activated. Code word 66 helps to prevent misactivation and unauthorized access.

Several types of codes 66 are possible. One type of code is a fixed code, wherein each transmission from a given remote control transmitter contains the same code 66. In contrast, variable code schemes change the bit pattern of code 66 with each activation. The most common variable code scheme, known as rolling code, generates code 66 by encrypting a counter value. After each activation, the counter is incremented. The encryption technique is such that a sequence of encrypted counter values appears to be random numbers.

Data word 60 is converted to a baseband stream, shown generally by 70, which is an analog signal typically transitioning between a high voltage level and a low voltage level. Various baseband encoding or modulation schemes are possible, including polar signaling, on-off signaling, bipolar signaling, duobinary signaling, Manchester signaling, and the like. Baseband stream 70 has a baseband power spectral density, shown generally by 72, centered around a frequency of zero.

Baseband stream 70 is converted to a radio frequency signal through a modulation process shown generally by 80. Baseband stream 70 is used to modulate one or more characteristics of carrier 82 to produce a broadband signal, shown generally by 84. Modulation process 80, mathematically illustrated in FIG. 2, implements a form of amplitude modulation commonly referred to as on-off keying. As will be recognized by one of ordinary skill in the art, many other modulation forms are possible, including frequency modulation, phase modulation, and the like. In the example shown, baseband stream 70 forms envelope 86 modulating carrier 82. As illustrated in broadband power spectral density 88, the effect in the frequency domain is to shift baseband power spectral density 72 to be centered around the carrier frequency, f, of carrier 82.

Figure 3:
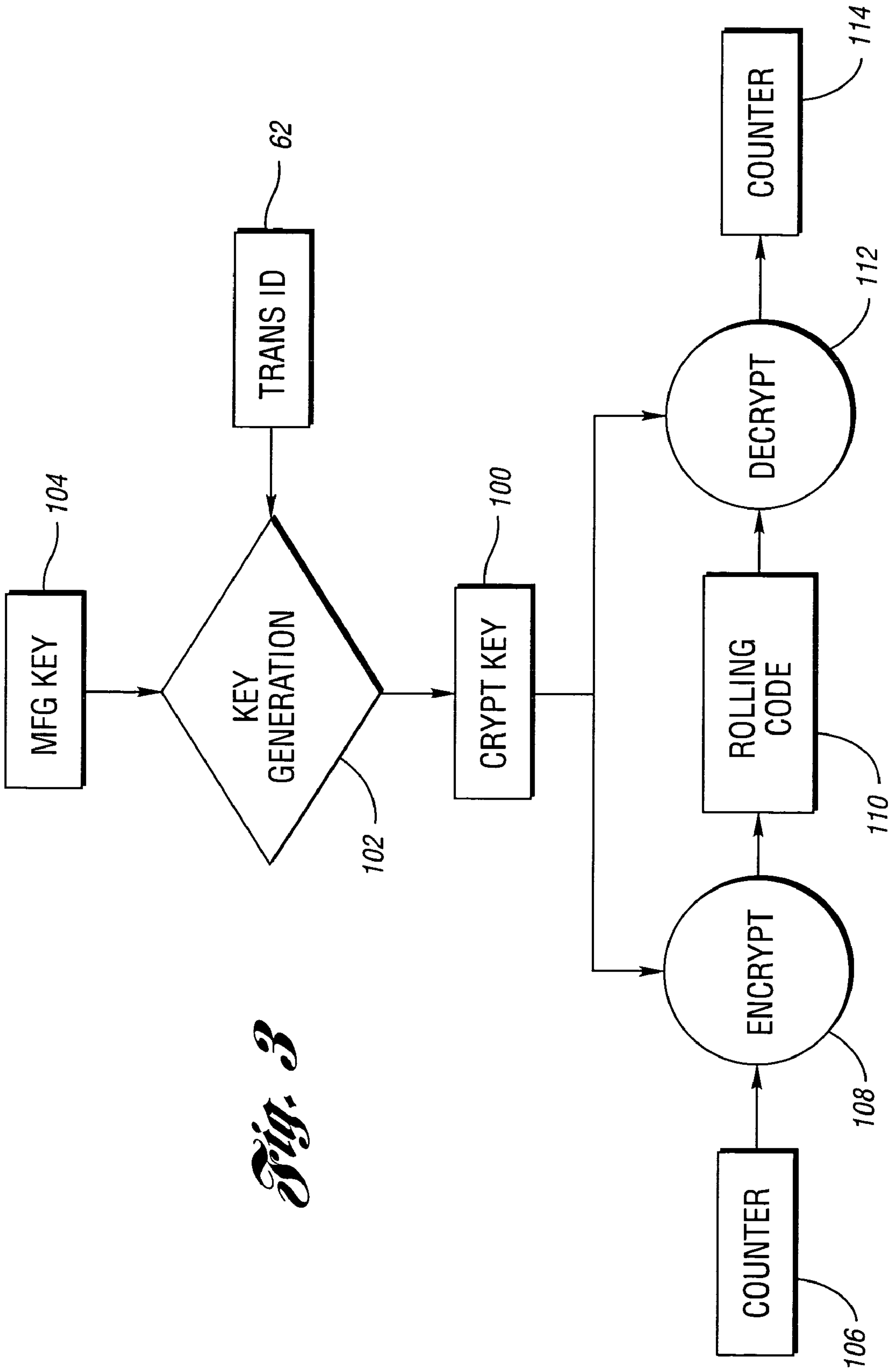
FIG. 3 is a block diagram illustrating rolling code operation that may be used with the present invention.

Referring now to FIG. 3, a block diagram illustrating rolling code operation that may be used with the present invention is shown. Remotely controlled systems using rolling code require crypt key 100 in both the transmitter and the receiver for normal operation. In a well-designed rolling code scheme, crypt key 100 is never transmitted from the transmitter to the receiver. Typically, crypt key 100 is generated using key generation algorithm 102 based on transmitter identifier 62 and a manufacturing (MFG) key 104. Crypt key 100 and transmitter identifier 62 are then stored in a particular transmitter. Counter 106 is also initialized in the transmitter. Each time an activation signal is sent, the transmitter uses encrypt algorithm 108 to generate rolling code 110 from counter 106 using crypt key 100. The transmitted activation signal includes rolling code 110 and transmitter identifier 62.

A rolling code receiver is trained to a compatible transmitter prior to operation. The receiver is placed into a learn mode. Upon reception of an activation signal, the receiver extracts transmitter identifier 62. The receiver then uses key generation algorithm 102 with manufacturing key 104 and received transmitter identifier 62 to generate crypt key 100 identical to the crypt key used by the transmitter. Newly generated crypt key 100 is used by decrypt algorithm 112 to decrypt rolling code 110, producing counter 114 equal to counter 106. The receiver then saves counter 114 and crypt key 100 associated with transmitter identifier 62. As is known in the encryption art, encrypt algorithm 108 and decrypt algorithm 112 may be the same algorithm.

In normal operation, when the receiver receives an activation signal, the receiver first extracts transmitter identifier 62 and compares transmitter identifier 62 with all learned transmitter identifiers. If no match is found, the receiver rejects the activation signal. If a match is found, the receiver retrieves crypt key 100 associated with received transmitter identifier 62 and decrypts rolling code 110 from the received activation signal to produce counter 114. If received counter 106 matches counter 114 associated with transmitter identifier 62, activation proceeds. Received counter 106 may also exceed stored counter 114 by a preset amount for successful activation.

Another rolling code scheme generates crypt key 100 based on manufacturing key 104 and a “seed” or random number. An existing transmitter sends this seed to an appliance receiver when the receiver is placed in learn mode. The transmitter typically has a special mode for transmitting the seed entered, for example, by pushing a particular combination of buttons. The receiver uses the “seed” to generate crypt key 100. As will be recognized by one of ordinary skill in the art, the present invention applies to the use of a “seed” for generating a crypt key as well as to any other variable code scheme.

Figure 4:
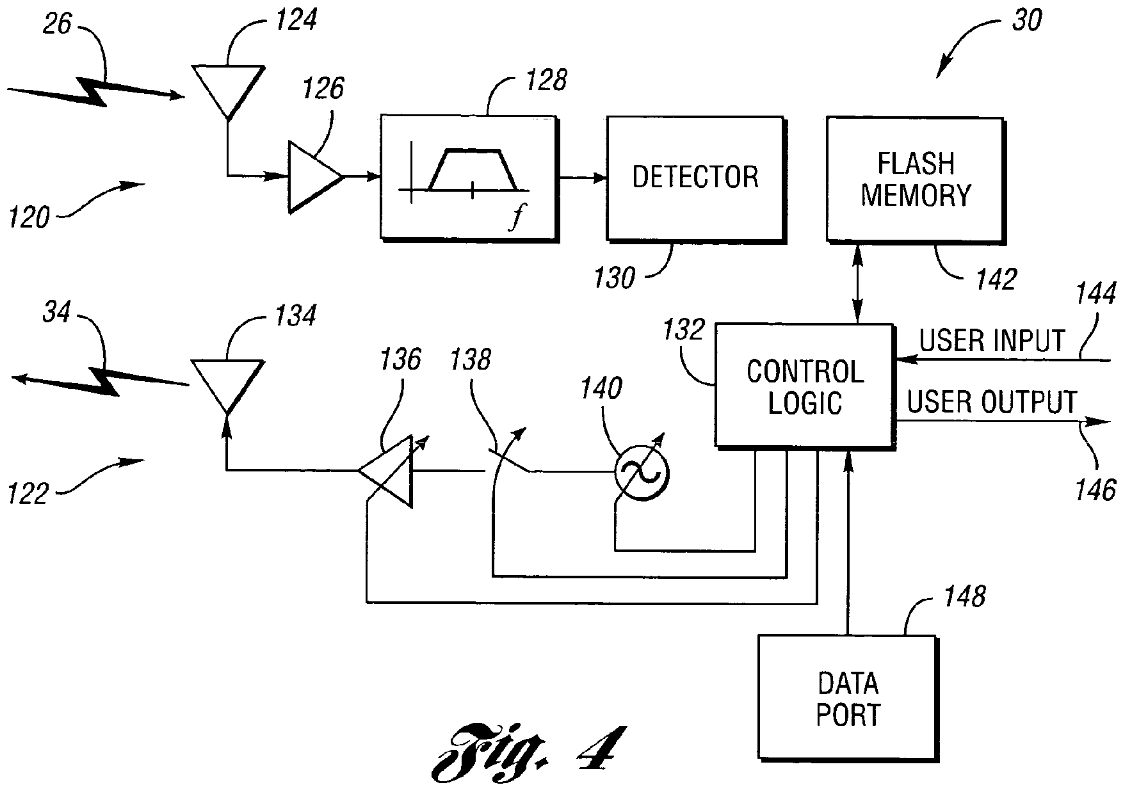
FIG. 4 is a block diagram of an appliance controller according to an embodiment of the present invention.

Referring now to FIG. 4, a block diagram of an appliance controller according to an embodiment of the present invention is shown. Transceiver 30 includes receiver section 120 and transmitter section 122. Receiver section 120 receives activation signal 26 from an existing transmitter on antenna 124. This signal is amplified in RF amplifier 126 and filtered in broadband band pass filter 128 set to pass all frequencies of interest. Detector 130 extracts base band data from the filtered RF signal. Typically, existing transmitter 28 is placed in close proximity with transceiver 30 when generating activation signal 26 for training transceiver 30. Therefore, activation signal 26 will be considerably stronger than any background noise or interfering radio frequency signal. Since the received signal is strong, detector 130 need not be complex. For example, an envelope detector is sufficient to retrieve data from activation signal 26. This data is provided to control logic 132.

Transmitter section 122 includes antenna 134, which may be the same as antenna 124, variable amplifier 136, modulator 138 and variable frequency oscillator 140. For each of a plurality of activation signals generated, control logic 132 sets the carrier frequency of the activation signal generated by variable frequency oscillator 140. Control logic 132 modulates the carrier frequency with modulator 138, modeled here as a switch, to produce an activation signal which is amplified by variable gain amplifier 136. Variable gain amplifier 136 is set to provide the maximum allowable output power to antenna 134. Control logic 132 transmits sequence of activation signals 34 by adjusting control of variable gain amplifier 136, modulator 138 and variable frequency oscillator 140 as needed for each sequential activation signal.

Transceiver 30 includes flash memory 142 holding characteristics for each of the plurality of activation signal schemes. Flash memory 142 may also hold learned fixed codes, code executable by control logic 132, and the like. User input 144 provides activation and training inputs to control logic 132. For simple systems, user input 144 is typically up to three pushbuttons. User output 146 displays control and status information to the user. In simple systems, user output 146 illuminates one or more display lamps. User input 144 and user output 146 may interface with a wide variety of vehicle control and display devices, either directly or through an in-vehicle bus, such as dashboard controls, instrument panel indicators, touch activated display screens, speech generators, tone generators, voice recognition systems, telematic systems, and the like.

Data port 148 provides a path through which transceiver 30 may be upgraded. Upgrading can include additional characteristics, additional executable code, and the like. For simple systems, data port 148 may implement a wired serial interface. Data port 148 may also interface with in-vehicle telematics to permit downloading of code and data through wireless transmission.

Figure 5:
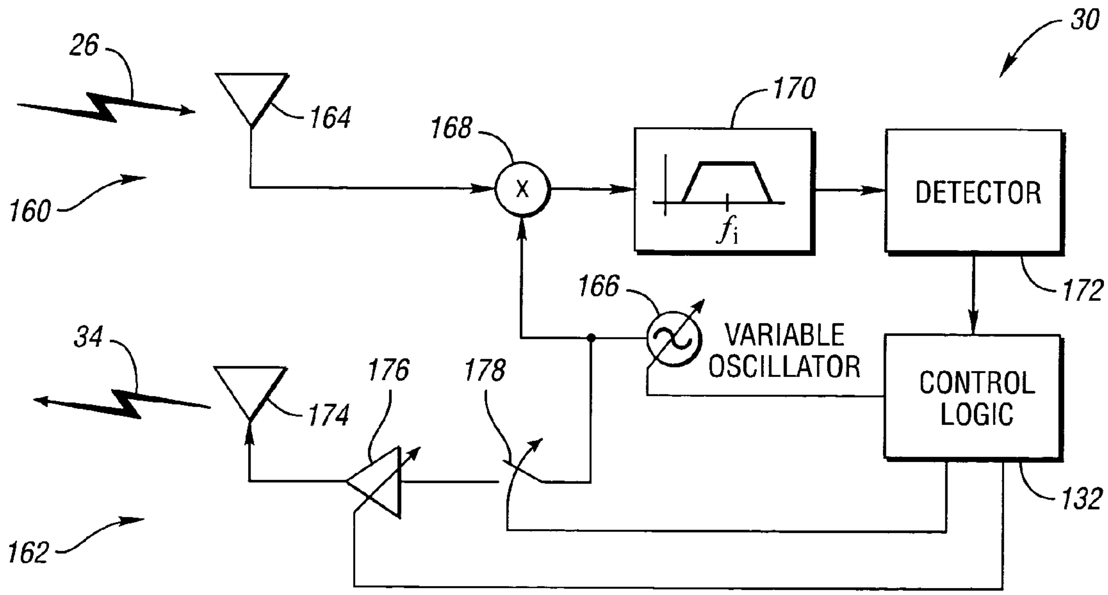
FIG. 5 is a block diagram of an appliance controller with carrier frequency determination according to an embodiment of the present invention.

Referring now to FIG. 5, a block diagram of an appliance controller with carrier frequency determination according to an embodiment of the present invention is shown. Wireless transceiver 30 includes a receiver section, shown generally by 160 and a transmitter section, shown generally by 162. Receiver section 160 includes antenna 164, variable oscillator 166, mixer 168, intermediate filter 170, detector 172 and control logic 132. Activation signal 26 is received by antenna 164. Mixer 168 accepts the received signal and a carrier frequency sinusoid from variable oscillator 166. Mixer 168 remodulates the received signal so that the broadband spectrum is centered about frequencies which are the sum and difference of the received signal carrier frequency and the variable oscillator carrier frequency. Control logic 132 varies the frequency of variable oscillator 166 until one of the remodulated components falls within the bandwidth of fixed, narrowband intermediate filter 170. Filter 170 passes this component and rejects all other signals. As will be recognized by one of ordinary skill in the art, receiver 160 functions as a super heterodyne receiver. Detector 172 converts the filtered signal into a base band signal. Detector 172 may be implemented as a simple envelope detector. When control logic 132 receives valid data from detector 172, the variable oscillator 166 is tuned to permit a received signal to pass through intermediate filter 170. If control logic 132 knows the intermediate frequency of filter 170, control logic 132 can determine the carrier frequency of the received signal.

Transmitter section 162 includes antenna 174, which may be the same as antenna 164, variable gain amplifier 176, modulator 178, variable oscillator 166 and control logic 132. For transmitting each activation signal in sequence of activation signals 34, control logic 132 sets variable oscillator 166 to the desired carrier frequency. Control logic 132 then modulates the carrier frequency with modulator 178, here modeled as a switch. Control logic 132 sets variable gain amplifier 176 to provide the maximum allowed signal strength. The amplified signal is transmitted by antenna 174. Components which make up wireless transceiver 30 in FIG. 5 are well known in the art of radio communications.

Examples of circuits which may be used to implement wireless transceiver 30 can be found in U.S. Pat. No. 5,614,891 titled Vehicle Accessory Trainable Transmitter, and U.S. Pat. No. 5,661,804, titled Trainable Transceiver Capable Of Learning Variable Codes; both of which are herein incorporated by reference in their entirety.

Figure 6:
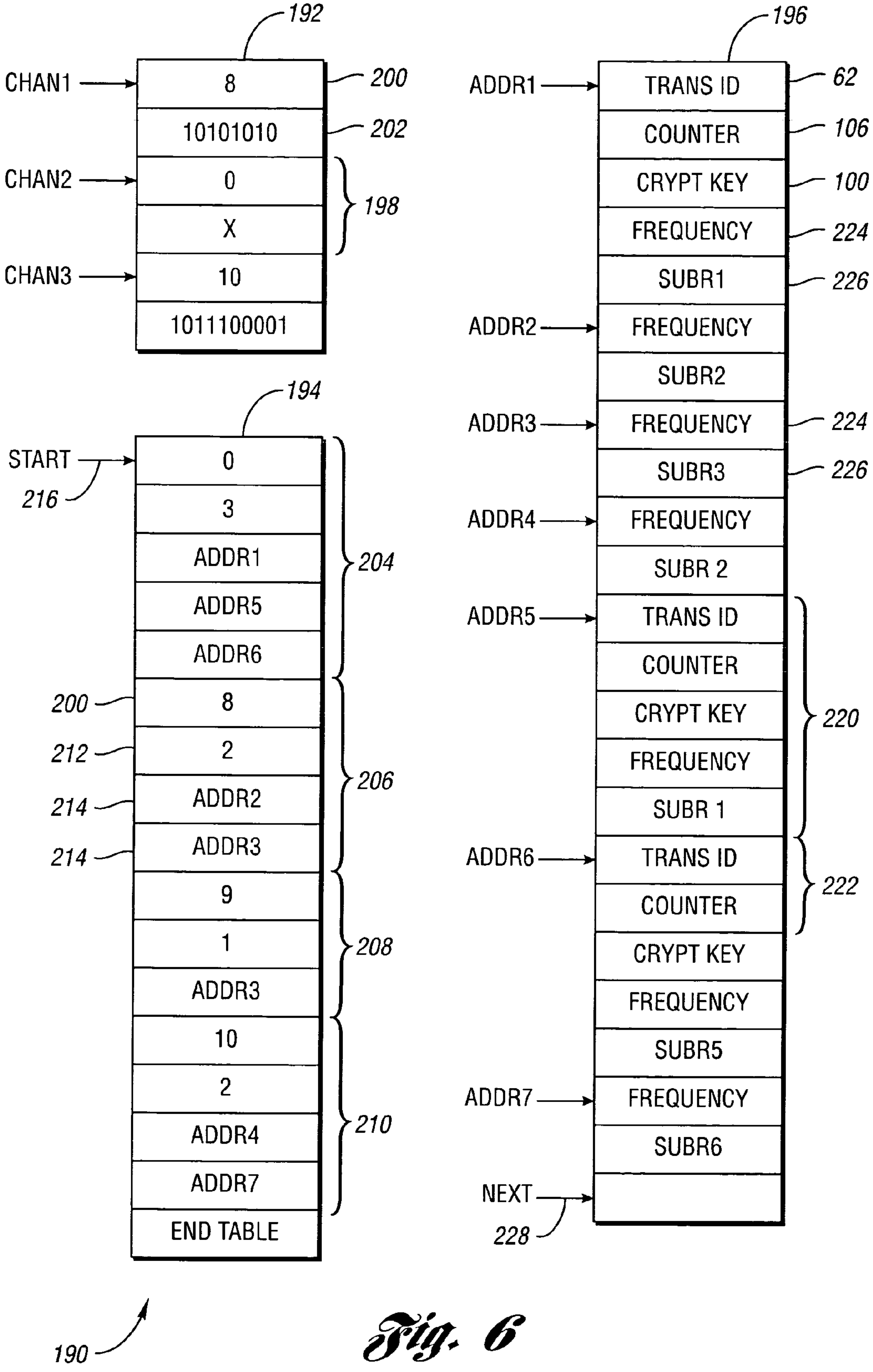
FIG. 6 is a memory map for implementing operating modes according to an embodiment of the present invention.

Referring now to FIG. 6, a memory map for implementing operating modes according to an embodiment of the present invention is shown. A memory map, shown generally by 190, represents the allocation of memory for data tables within transceiver 30. Preferably, this data is held in nonvolatile memory such as flash memory 142. Memory map 190 includes channel table 192, mode table 194 and scheme table 196.

Channel table 192 includes a channel entry, one of which is indicated by 198, for each channel supported by transceiver 30. Typically, each channel corresponds to a user input. In the example illustrated in FIG. 6, three channels are supported. Each channel entry 198 has two fields, mode indicator 200 and fixed code 202. Mode indicator 200 indicates the mode programmed for that channel. In the embodiment shown, a zero in mode indicator 200 indicates rolling code mode. A non-zero integer in mode indicator 200 indicates a fixed code mode with a code size equal to the integer value. For example, the first channel (CHAN1) has been programmed for eight-bit fixed code operation, the second channel (CHAN2) has been programmed for rolling code operation and the third channel (CHAN3) has been programmed for ten-bit fixed code operation. Fixed code value 202 holds the programmed fixed code for a fixed code mode. Fixed code value 202 may also hold function code 64 in fixed code modes. Fixed code value 202 may hold function code 64 or may not be used at all in a channel programmed for a rolling code mode.

Mode table 194 contains an entry for each mode supported. The four entries illustrated are rolling code entry 204, eight-bit fixed code entry 206, nine-bit fixed code entry 208 and ten-bit fixed code entry 210. Each entry begins with mode indicator 200 for the mode represented, the next value is scheme count 212 indicating the number of schemes to be sequentially transmitted in that mode. Following scheme count 212 is a scheme address 214 for each scheme. The address of the first entry of mode table 194 is held in table start pointer 216 known by control logic 132. When accessing data for a particular mode, control logic 132 searches through mode table 194 for mode indicator 200 matching the desired mode. The use of mode indicators 200 and scheme counts 212 provides a flexible representation for adding new schemes to each mode and adding new modes to mode table 194.

Scheme table 196 holds characteristics and other information necessary for generating each activation signal in sequence of activation signals 34. Scheme table 196 includes a plurality of rolling code entries, one of which is indicated by 220, and a plurality of fixed code entries, one of which is indicated by 222. Each rolling code entry 220 includes transmitter identifier 62, counter 106, crypt key 100, carrier frequency 224, and subroutine address 226. Carrier frequency 224 may be predetermined or may be determined from a received activation signal 26. Subroutine address 226 points to code executable by control logic 132 for generating an activation signal. Additional characteristics may be embedded within this code. Each fixed code entry 222 includes carrier frequency 224 and subroutine address 226. Next pointer 228 points to the next open location after scheme table 196. Any new schemes received by control logic 132 from data port 148 may be appended to scheme table 196 using next pointer 228.

Memory map 190 illustrated in FIG. 6 implements a single rolling code mode and three fixed code modes based on the fixed code size. Other arrangement of modes are possible. For example, more than one rolling code modes may be used. Only one fixed code mode may be used. If more than one fixed code mode is used, characteristics other than fixed code size may be used to distinguish between fixed code modes. For example, fixed code schemes may be grouped by carrier frequency, modulation technique, base band modulation, and the like.

Referring now to FIGS. 7–11, flow charts illustrating transceiver operation according to an embodiment of the present invention is shown. As will be appreciated by one of ordinary skill in the art, the operations illustrated are not necessarily sequential operations. Similarly, operations may be performed by software, hardware, or a combination of both. The present invention transcends any particular implementation and the aspects are shown in sequential flowchart form for ease of illustration.

Figure 7:
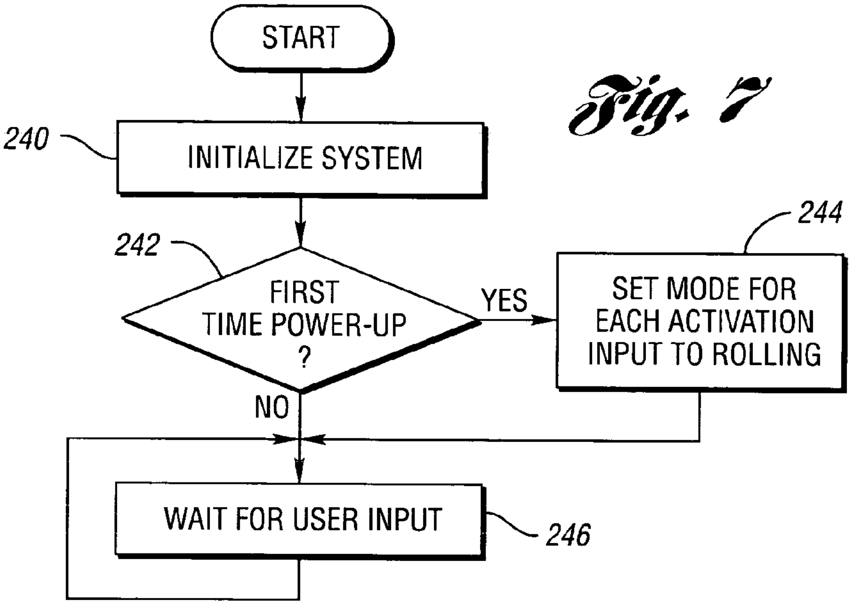
FIGS. 7–11 are flow charts illustrating transceiver operation according to an embodiment of the present invention.

Referring to FIG. 7, a top level flowchart is shown. System initialization occurs, as in block 240. Control logic 132 is preferably implemented with a microcontroller. Various ports and registers are typically initialized on power up. A check is made to determine if this is a first power up occurrence, as in block 242. If so, the mode for each channel is set to rolling code, as in block 244. The system then waits for user input, as in block 246.

Figure 8:
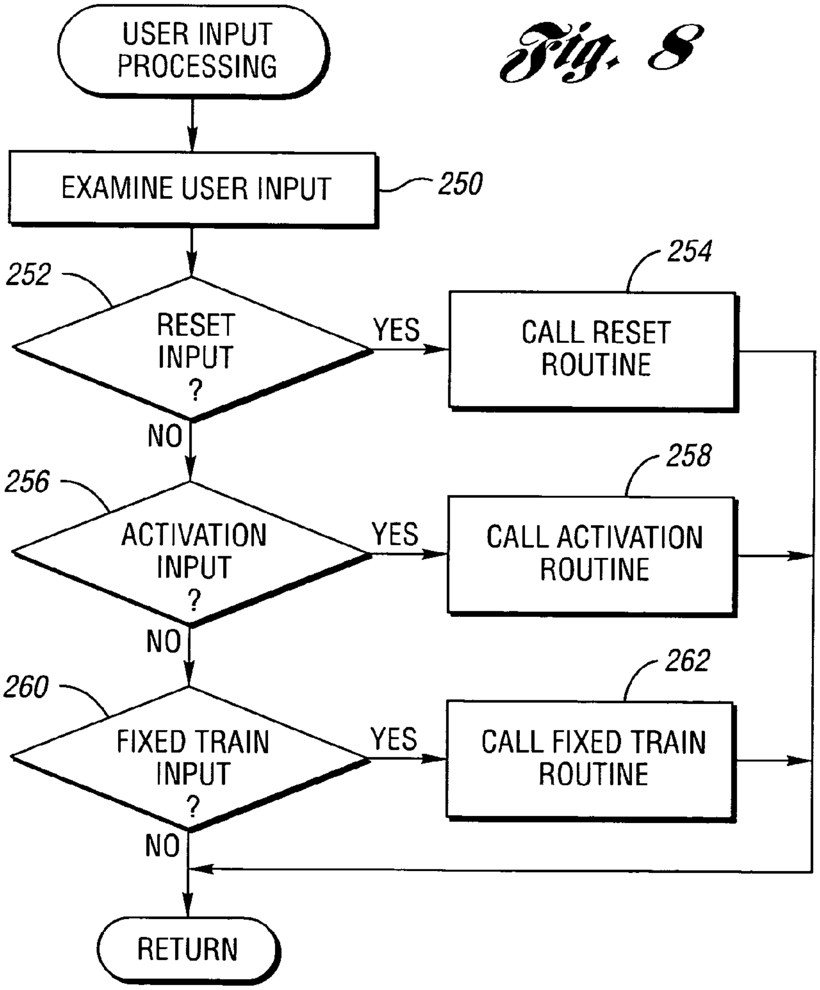

Referring now to FIG. 8, a flowchart illustrating response to user input is shown. The user input is examined, as in block 250. A check is made for reset input, as in block 252. If so, a reset routine is called, as in block 254. If not, a check is made for activation input, as in block 256. If so, an activation routine is called, as in block 258. If not, a check is made to determine if fixed code training input has been received, as in block 260. If so, a fixed code training routine is called, as in block 262. Other input options are possible, such as placing transceiver 30 into a download mode.

Interpreting user input depends upon the type of user input 144 supported by transceiver 30. For a simple pushbutton system, a button depression of short duration may be used to signify activation input for the channel assigned to the button. Holding the button for a moderate length of time may be used to signify fixed training input. Holding the button for an extended period of time may be used to indicate reset input.

Figure 9:
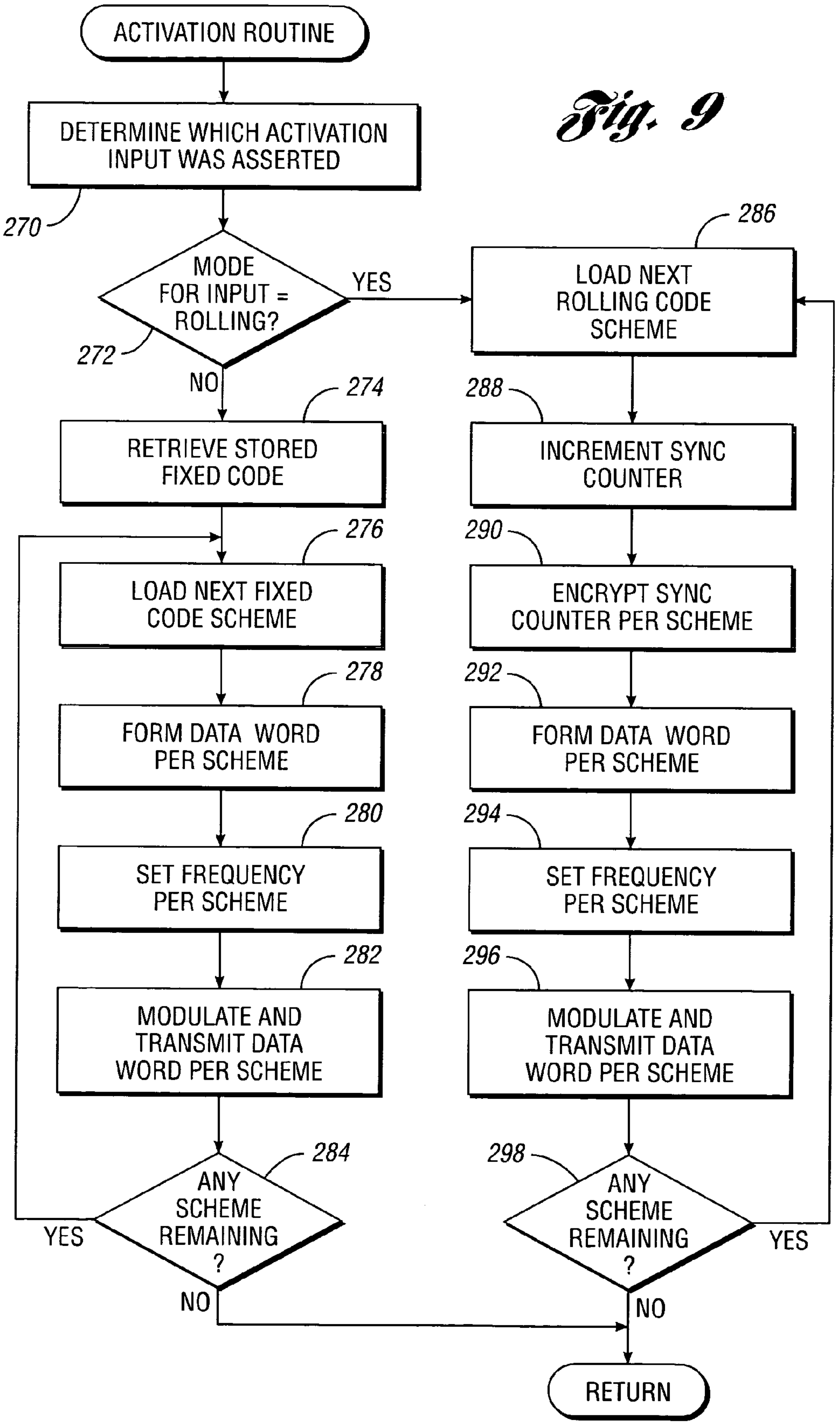

Referring now to FIG. 9, a flowchart illustrating an activation routine is shown. A determination is made as to which activation input was asserted, in block 270. For the selected channel, a check is made to determine under which mode the activation input channel is operating, as in block 272. This determination can be accomplished by examining channel table 192 as described above. For a fixed code mode, the stored fixed code is retrieved, as in block 274. A loop is executed for each scheme associated with the fixed code mode. Characteristics for the next scheme are loaded, as in block 276. A data word is formed using the fixed code, as in block 278. The frequency is set, as in block 280. The data word is modulated and transmitted, as in block 282. A check is made to determine if any schemes remain, as in block 284. If so, blocks 276, 278, 280 and 282 are repeated. If not, the activation routine terminates.

Considering again block 272, if the channel mode corresponding to the asserted input is a rolling code mode, a rolling code activation signal loop is entered. Characteristics of the next rolling code scheme are loaded, as in block 286. The synchronization (sync) counter associated with the current scheme is incremented, as in block 288. The incremented counter value is also stored. The synchronization counter is encrypted using the crypt key to produce a rolling code value, as in block 290. A data word is formed using the rolling code value, as in block 292. The carrier frequency is set, as in block 294. The data word is modulated and transmitted, as in block 296. A check is made to determine if any schemes remain in the rolling code mode, as in block 298. If so, blocks 286, 288, 290, 292, 294 and 296 are repeated. If no schemes remain, the activation routine is terminated.

Figure 10:
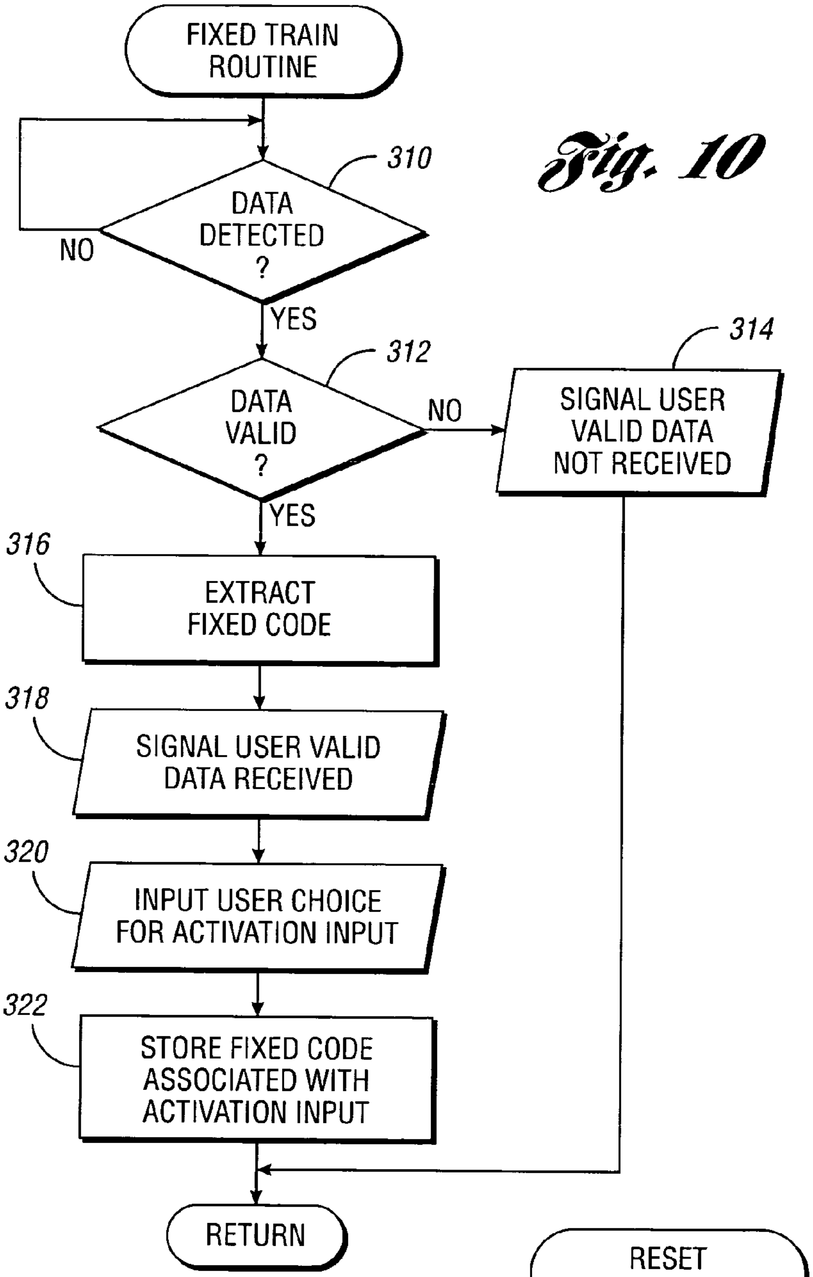

Referring now to FIG. 10, a fixed code training routine is shown. Once the training routine is entered, transceiver 30 waits until data is detected, as in block 310. A check is then made to determine if the received data is valid, as in block 312. If not, the user is signaled that valid data was not received, as in block 314. This may be accomplished, for example, by flashing indicator lamps with user output 146. If valid data is received, the fixed code is extracted, as in block 316. The user is signaled that valid data was received, as in block 318. This may be accomplished, for example, by steady illumination of lamps with user output 146. User input indicating a choice for activation input channel is received, as in block 320. This step is not necessary if the fixed code training routine was entered by a method indicating which channel was being trained for fixed code. The fixed code is stored associated with the appropriate channel, as in block 322.

Figure 11:
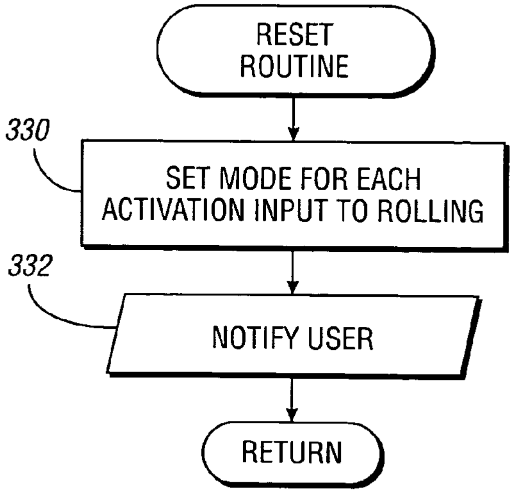

Referring now to FIG. 11, a reset routine is shown. Each activation input channel is set to rolling mode, as in block 330. The user is notified of successful reset, as in block 332. Once again, a pattern of flashing indicator lamps may be used for this indication. Alternatively, if reset routine is entered by asserting a particular user input 144 such as, for example, by depressing a pushbutton for an extended period of time, then only the mode corresponding to that user input need be reset by the reset routine.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for wirelessly activating an appliance, the appliance associated with an appliance receiver for receiving a wireless activation signal, the appliance responding to one of a plurality of transmission schemes, the system comprising:

a receiver section separate from the appliance receiver, the receiver section operative to receive a radio frequency activation signal;

a transmitter operative to transmit a radio frequency activation signal;

at least one user activation input, each activation input identifying a wireless channel;

memory holding data describing a plurality of rolling code transmission schemes associated with a rolling code mode and a plurality of fixed code transmission schemes, at least one fixed code transmission scheme associated with each of at least one fixed code mode; and control logic in communication with the receiver section, the transmitter, the at least one user activation input and the memory, for each channel the control logic maintaining a channel mode set initially to a rolling code mode, the channel mode changing to one of the at least one fixed code mode if the channel is trained to a fixed code in response to receiving a signal transmitted from an existing transmitter, the control logic in response to an assertion of the user activation input associated with the channel generating and transmitting an activation signal based on each transmission scheme associated with the mode maintained for the channel.

2. The system of claim 1 wherein the at least one fixed code mode is a single fixed code mode.

3. The system of claim 1 wherein the at least one fixed code mode is a plurality of fixed code modes.

4. The system of claim 3 wherein each fixed code has a code size and wherein the control logic determines the fixed code channel mode based on the code size of the fixed code used to train the channel.

5. The system of claim 3 wherein the receiver section is operative to identify a carrier frequency of a received signal and wherein the control logic determines the fixed code mode based on the identified carrier frequency.

6. The system of claim 3 wherein the control logic determines the channel mode as one of the fixed code modes through guess-and-test user interaction.

7. The system of claim 1 wherein the channel mode may be reset to rolling code mode.

8. The system of claim 1 further comprising a data port operative to download data describing at least one scheme into the memory.

9. The system of claim 1 wherein the control logic generates and transmits activation signals based on a popularity of schemes, thereby reducing an average activation latency time.

10. The system of claim 1 wherein the memory holds data representing a carrier frequency for each transmission scheme whereby a user does not manually enter frequency information.

11. The system of claim 1 wherein the memory holds a different counter value for each of the plurality of rolling code transmission schemes.

12. A method for use in a wireless appliance activation transceiver system having a transmitter section and a receiver section, the method controlling an appliance activated by a radio frequency activation signal received by an appliance receiver and described by a transmission scheme, the transmission scheme one of a plurality of possible transmission schemes including a plurality of rolling code transmission schemes and a plurality of fixed code transmission schemes, the method comprising:

establishing a mode as rolling mode in the transceiver system;

if a fixed code in a radio frequency activation signal received by the receiver section from an existing transmitter is detected, storing the detected fixed code and changing the mode to fixed mode;

receiving in the transceiver system an activation request from a user;

if the mode is rolling mode, generating in the transceiver system and transmitting from the transmitter section to the appliance receiver a sequence of activation signals, each activation signal based on one of the plurality of rolling code transmission schemes; and if the mode is fixed mode, generating in the transceiver system and transmitting from the transmitter section to the appliance receiver at least one activation signal, each of the at least one activation signal based on one of the plurality of fixed code transmission schemes, each of the at least one activation signal including the stored fixed code.

13. The method of claim 12 wherein the at least one transmitted fixed code activation signal is a plurality of fixed code activation signals.

14. The method of claim 13 wherein each of the plurality of fixed code transmission schemes is used to generate at least one of the plurality of fixed code activation signals.

15. The method of claim 13 wherein each of a subset of the plurality of fixed code transmission schemes is used to generate at least one of the plurality of fixed code activation signals.

16. The method of claim 15 wherein membership in the subset is based on a size of the stored fixed code.

17. The method of claim 15 wherein membership in the subset is based on a carrier frequency of the radio frequency activation signal received from the existing transmitter.

18. The method of claim 15 wherein the subset is determined from a plurality of subsets by user guess-and-test interaction.

19. The method of claim 12 wherein the at least one transmitted fixed code activation signal is one fixed code activation signal.

20. The method of claim 12 further comprising resetting the mode to rolling mode based on user input.

21. The method of claim 12 further comprising learning at least one transmission scheme through a data port.

22. The method of claim 12 wherein an order in the sequence of activation signals is established based on the popularity of each of the rolling code transmission schemes.

23. The method of claim 12 wherein each rolling code transmission scheme includes a separate counter value, each counter value used to generate a rolling code value.

* * * * *